US012243434B2

(12) United States Patent
Tazume et al.

(10) Patent No.: US 12,243,434 B2
(45) Date of Patent: Mar. 4, 2025

(54) CONTROL DEVICE, CONTROL METHOD, AND UNMANNED AERIAL VEHICLE SEARCH SYSTEM

(71) Applicant: Rakuten Group, Inc., Tokyo (JP)

(72) Inventors: Toshiaki Tazume, Tokyo (JP); Daiki Tanaka, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/799,759

(22) PCT Filed: Sep. 29, 2021

(86) PCT No.: PCT/JP2021/035861

§ 371 (c)(1),
(2) Date: Aug. 15, 2022

(87) PCT Pub. No.: WO2023/053269

PCT Pub. Date: Apr. 6, 2023

(65) Prior Publication Data

US 2024/0212513 A1 Jun. 27, 2024

(51) Int. Cl.
*G08G 5/00* (2006.01)
*B64D 1/02* (2006.01)

(52) U.S. Cl.
CPC ......... *G08G 5/0069* (2013.01); *G08G 5/0026* (2013.01); *G08G 5/0056* (2013.01)

(58) Field of Classification Search
CPC .. G08G 5/0069; G08G 5/0021; G08G 5/0043; H04B 7/18504; G06F 16/90335; B64D 1/02; H04W 4/023; B64C 27/08; B64C 39/02; G05D 1/0022
See application file for complete search history.

(56) References Cited

U.S. PATENT DOCUMENTS 9,477,226 B2 * 10/2016 Olson ................ H04B 7/18504
2016/0300496 A1 10/2016 Cheatham, III et al.
2017/0088261 A1 3/2017 Sequeira et al.
2017/0154536 A1 * 6/2017 Kreiner ................ G08G 5/0043
2018/0319495 A1 * 11/2018 Tu ......................... H04W 4/023
2019/0084676 A1 * 3/2019 Hallissy ................... B64D 1/02
2021/0134163 A1 * 5/2021 Wissler ................ G08G 5/0069
(Continued)

FOREIGN PATENT DOCUMENTS

AU 2014200051 B2 * 11/2017 ........... G05D 1/0022
CN 105758993 A * 7/2016 ............ B64C 39/02
(Continued)

OTHER PUBLICATIONS

International Search Report PCT/JP2021/035861 dated, Dec. 21, 2021 (PCT/ISA/210).
(Continued)

*Primary Examiner* — Yuri Kan
(74) *Attorney, Agent, or Firm* — Sughrue Mion, PLLC

(57) ABSTRACT

The control unit 16 of the UAV 1 detects the UAV 50 as a search target on the basis of the sensing data obtained by sensing of the sensor unit 14, and moves the UAV 1 to a position above the detected UAV 50. Then, the control unit 16 identifies a current position of the UAV 1 when the UAV 1 has moved to the position above the UAV 50, and transmits search position information indicating the identified current position as the current position of the UAV 50.

11 Claims, 11 Drawing Sheets

(56) References Cited

U.S. PATENT DOCUMENTS

| | | | | |
|---|---|---|---|---|
| 2021/0224739 | A1* | 7/2021 | Sweeny | G06F 16/90335 |
| 2022/0262263 | A1* | 8/2022 | Elhossini | G08G 5/0021 |

FOREIGN PATENT DOCUMENTS

| | | | | |
|---|---|---|---|---|
| CN | 111352443 | A | 6/2020 | |
| JP | 2007-047136 | A | 2/2007 | |
| JP | 2020-37353 | A | 3/2020 | |
| WO | WO-2017026354 | A1 * | 2/2017 | B64C 27/08 |
| WO | 2017/057157 | A1 | 4/2017 | |

OTHER PUBLICATIONS

Machine English Translation of Chinese Office Action dated Dec. 16, 2024, issued in Chinese Application No. 202180016071.9.

* cited by examiner

CONTROL DEVICE, CONTROL METHOD, AND UNMANNED AERIAL VEHICLE SEARCH SYSTEM

CROSS REFERENCE TO RELATED APPLICATIONS

This application is a National Stage of International Application No. PCT/JP2021/035861 filed Sep. 29, 2021.

TECHNICAL FIELD

The present invention relates to a technical field such as a system for searching for a missing unmanned aerial vehicle.

BACKGROUND ART

Conventionally, in order to enable efficient search and recovery of a missing unmanned aerial vehicle, Patent Literature 1, for example, discloses a known technology in which a loss prevention device installed in an unmanned aircraft acquires position information that is information for identifying the current position of the unmanned aircraft in flight, and transmits, when landing of the unmanned aircraft is detected on the ground, the position information to a management station. This makes it possible to estimate the current position of the unmanned aircraft from the position information up to the landing point even when a GPS receiver is not effectively operated at the landing point of the unmanned aircraft.

CITATION LIST

Patent Literature

Patent Literature 1: WO 2017/026354 A

SUMMARY OF INVENTION

Technical Problem

Unfortunately, in the technology disclosed in Patent Literature 1, at the time of landing of the unmanned aircraft, the device installed in the unmanned aircraft may not function due to the impact or other reasons, so that the position information about the missing unmanned aircraft may be unable to be transmitted to the management station. In this case, the problem is that the current position of the missing unmanned aircraft cannot be accurately estimated, so that it becomes difficult to collect the unmanned aircraft.

Therefore, one or more embodiments of the present invention are directed to providing a control device, a control method, and an unmanned aerial vehicle search system that enable efficient recovery of a missing unmanned aerial vehicle.

Solution to Problem

In response to the above issue, the invention according to claim 1 is a control device that controls a second unmanned aerial vehicle for searching for a missing first unmanned aerial vehicle. The control device includes: detection means configured to detect the first unmanned aerial vehicle as a search target on the basis of sensing data obtained by sensing of a sensor included in the second unmanned aerial vehicle; flight control means configured to move the second unmanned aerial vehicle to a position above the first unmanned aerial vehicle detected by the detection means; first identifying means configured to identify a position of the second unmanned aerial vehicle in a horizontal direction when the second unmanned aerial vehicle has moved to the position above the first unmanned aerial vehicle; and transmission means configured to transmit, to a given device, first position information indicating the position identified by the first identifying means as a first position of the first unmanned aerial vehicle in a horizontal direction. This makes it possible to efficiently recover the missing unmanned aerial vehicle.

The invention according to claim 2 is the control device according to claim 1, wherein the flight control means makes the second unmanned aerial vehicle hover at the position above the first unmanned aerial vehicle. This makes the second unmanned aerial vehicle a mark of the current position of the first unmanned aerial vehicle, thereby allowing a collector to easily grasp the position of the missing first unmanned aerial vehicle.

The invention according to claim 3 is the control device according to claim 1 or 2, wherein the flight control means acquires second position information indicating a second position that is immediately before the first unmanned aerial vehicle disappears and is in the horizontal direction of the first unmanned aerial vehicle, flies the second unmanned aerial vehicle from a departure place of the second unmanned aerial vehicle toward the second position in a normal flight mode, and flies the second unmanned aerial vehicle by switching from the normal flight mode to a search flight mode when the second unmanned aerial vehicle enters a range having a predetermined distance from the second position. This makes it possible to reduce power consumption of the second unmanned aerial vehicle and to improve search efficiency.

The invention according to claim 4 is the control device according to any one of claims 1 to 3, wherein the flight control means decreases a flight speed of the second unmanned aerial vehicle in response to switching from the normal flight mode to the search flight mode. This allows for detection, with enough time, of the first unmanned aerial vehicle, so that the accuracy of detection of the first unmanned aerial vehicle can be increased.

The invention according to claim 5 is the control device according to any one of claims 1 to 4, wherein the second unmanned aerial vehicle includes, as each sensor, an optical sensor used for flight control of the second unmanned aerial vehicle and a thermosensor that contactlessly senses a temperature radiated by the search target. The detection means detects the first unmanned aerial vehicle on the basis of sensing data obtained by sensing of the thermosensor instead of the optical sensor or together with the optical sensor in response to switching from the normal flight mode to the search flight mode. This makes it possible to detect the temperature of battery in the first unmanned aerial vehicle, so that the accuracy of detection of the first unmanned aerial vehicle can be increased.

The invention according to claim 6 is the control device according to any one of claims 1 to 5, wherein the flight control means moves the second unmanned aerial vehicle to a position away from the position above the first unmanned aerial vehicle in a case where it is difficult to move the second unmanned aerial vehicle to the position above the first unmanned aerial vehicle. The control device further includes second identifying means configured to identify a position of the second unmanned aerial vehicle in the horizontal direction, an azimuth angle of the second unmanned aerial vehicle, and a distance from the second unmanned aerial vehicle to the first unmanned aerial vehicle when the second unmanned aerial vehicle has moved to the position away from the position above the first unmanned aerial vehicle, and identify the first position of the first unmanned aerial vehicle in the horizontal direction on the basis of the identified position, the identified azimuth angle, and the identified distance. The transmission means transmits, to the given device, the first position information indicating the first position identified by the second identifying means. This makes it possible to improve the safety of the second unmanned aerial vehicle.

The invention according to claim 7 is the control device according to any one of claims 1 to 6 further including determination means configured to identify an estimated time when a collector arrives at the first position so as to recover the first unmanned aerial vehicle after the first unmanned aerial vehicle is detected and a remaining capacity of a battery of the second unmanned aerial vehicle, and determine whether or not to temporarily land the second unmanned aerial vehicle at a place where the second unmanned aerial vehicle can land around the first position on the basis of the estimated time and the remaining capacity of the battery. When the determination means determines to temporarily land the second unmanned aerial vehicle at the place where the second unmanned aerial vehicle can land, the flight control means temporarily lands the second unmanned aerial vehicle at the place where the second unmanned aerial vehicle can land, and then takes off the second unmanned aerial vehicle to move the second unmanned aerial vehicle to the position above the first unmanned aerial vehicle. This makes it possible to reduce the power consumption of the second unmanned aerial vehicle.

The invention according to claim 8 is the control device according to any one of claims 1 to 6 further including determination means configured to determine whether or not the first unmanned aerial vehicle is moving after the first unmanned aerial vehicle is detected. When the determination means determines that the first unmanned aerial vehicle is moving, the flight control means makes the second unmanned aerial vehicle stand by at a specific place for a predetermined time, and then moves the second unmanned aerial vehicle to the position above the first unmanned aerial vehicle. This makes it possible to improve the safety of the second unmanned aerial vehicle.

The invention according to claim 9 is a control method executed by one or more computers for controlling a second unmanned aerial vehicle for searching for a missing first unmanned aerial vehicle, the control method comprising the steps of: detecting the first unmanned aerial vehicle as a search target on a basis of sensing data obtained by sensing of a sensor included in the second unmanned aerial vehicle; causing the second unmanned aerial vehicle to move to a position above the detected first unmanned aerial vehicle; identifying a position of the second unmanned aerial vehicle in a horizontal direction when the second unmanned aerial vehicle has moved to the position above the first unmanned aerial vehicle; and transmitting, to a given device, first position information indicating the identified position as a first position of the first unmanned aerial vehicle in a horizontal direction.

The invention according to claim 10 is an unmanned aerial vehicle search system including a second unmanned aerial vehicle for searching for a missing first unmanned aerial vehicle, the unmanned aerial vehicle search system comprising: detection means configured to detect the first unmanned aerial vehicle as a search target on a basis of sensing data obtained by sensing of a sensor included in the second unmanned aerial vehicle; flight control means configured to move the second unmanned aerial vehicle to a position above the first unmanned aerial vehicle detected by the detection means; first identifying configured to identify a position of the second unmanned aerial vehicle in a horizontal direction when the second unmanned aerial vehicle has moved to the position above the first unmanned aerial vehicle; and transmission means configured to transmit, to a given device, first position information indicating the position identified by the first identifying means as a first position of the first unmanned aerial vehicle in a horizontal direction.

Advantageous Effect of the Invention

According to one or more embodiments of the present invention, it is possible to efficiently recover the missing unmanned aerial vehicle.

DESCRIPTION OF EMBODIMENTS

Hereinafter, one or more embodiments of the present invention will be described with reference to the drawings. In an unmanned aerial vehicle search system S according to this embodiment, a second unmanned aerial vehicle for search (for investigation) is used to search for a missing first unmanned aerial vehicle. In the following description, the missing first unmanned aerial vehicle is referred to as an UAV (Unmanned Aerial Vehicle) 50, and the second unmanned aerial vehicle for searching for the UAV 50 is referred to as an UAV 1. The UAV 50 and the UAV 1 are also each called a drone or a multicopter, and can fly or autonomously fly in the air by remote control. In this embodiment, it is assumed that the UAV 50 disappears while flying for, for instance, transportation (delivery), surveying, imaging, inspection, monitoring or the like. The flight path of the UAV 50 is assumed to pass through, for example, a mountainous area or a mountain area. Here, the "missing" means that where is the UAV 50 is unidentifiable. For example, the "missing" falls under a situation in which a traffic management system (traffic management station) that manages flights of aerial vehicles cannot receive a regular signal (e.g., self-position information) from the UAV 50.

[1. Configuration and Operation Outline of Unmanned Aerial Vehicle Search System S]

Figure 1:
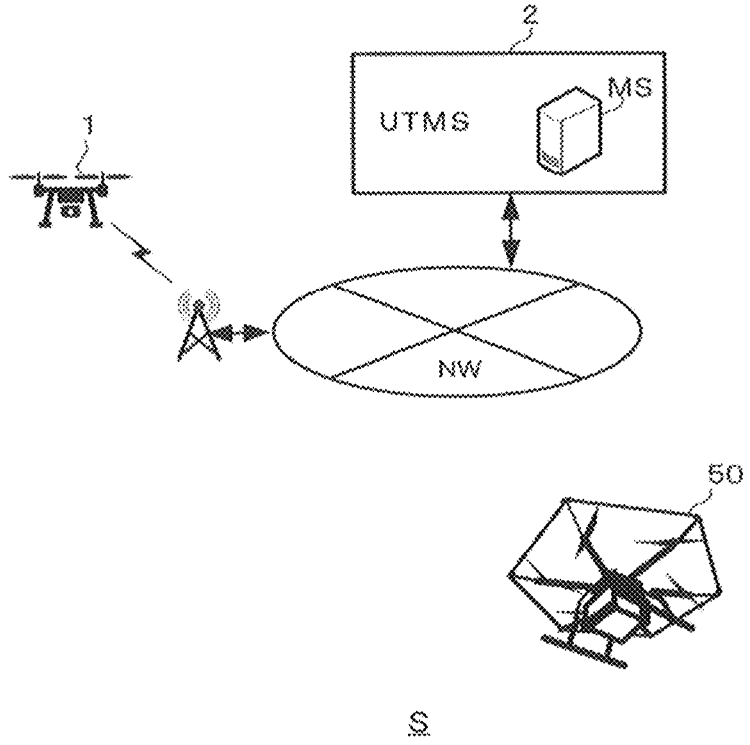
FIG. 1 is a diagram illustrating a schematic configuration example of an unmanned aerial vehicle search system S.

First, FIG. 1 is used as a reference to describe the configuration and operation outline of an unmanned aerial vehicle search system S according to this embodiment. FIG. 1 is a diagram illustrating a schematic configuration example of the unmanned aerial vehicle search system S. As illustrated in FIG. 1, the unmanned aerial vehicle search system S includes a UAV 1 and a traffic management system (hereinafter, referred to as an UTMS (UAV Traffic Management System)) 2. The UAV 1 and the UTMS 2 can communicate with each other via a communication network NW. The communication network NW includes, for example, the Internet, a mobile communication network, a radio base station thereof, and the like. The UTMS 2 is provided with one or more servers including a management server MS. The management server MS is an example of the given device. The management server MS manages a pre-flight traffic plan of the UAV 50 and the UAV 1, and manages and controls flight statuses of the UAV 50 and the UAV 1 in flight. The flight statuses are managed, for example, on the basis of self-position information, together with the vehicle ID (identifier), sequentially transmitted from each of the UAV 50 and the UAV 1 to the management server MS. The vehicle ID of the UAV 1 is stored. The vehicle ID is identification information for identifying each of the UAV 50 or the UAV 1.

[1-1. Configuration and Function of UAV 1]

Figure 2:
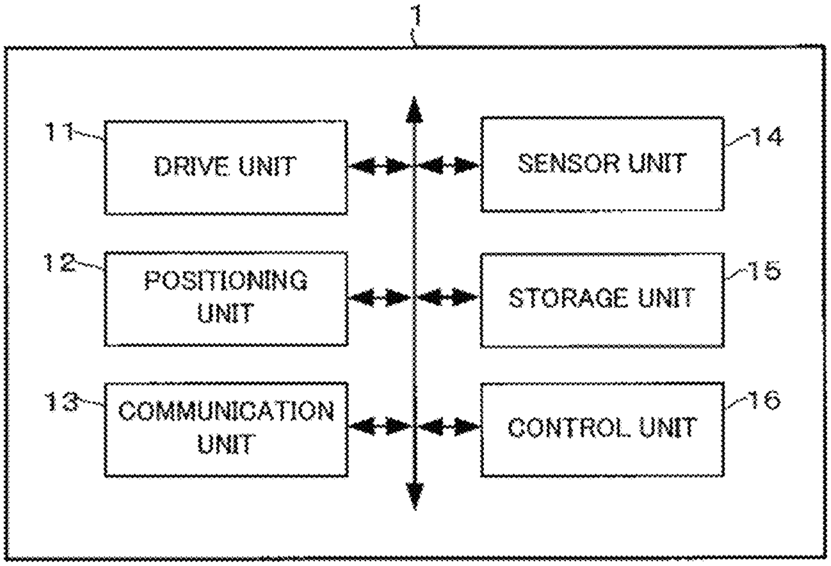
FIG. 2 is a diagram illustrating a schematic configuration example of an UAV 1.

Next, the configuration and function of the UAV 1 will be described with reference to FIG. 2. FIG. 2 is a diagram illustrating a schematic configuration example of the UAV 1. As illustrated in FIG. 2, the UAV 1 includes a drive unit 11, a positioning unit 12, a communication unit 13, a sensor unit 14, a storage unit 15, a control unit 16, and the like. The UAV 1 further includes a battery (not shown) that supplies power to each unit of the UAV 1, a rotor (propeller) that is horizontal rotary blades, and the like. The remaining capacity (residual quantity) of the battery may be monitored by the control unit 16. Incidentally, the UAV 50 may also be configured as illustrated in FIG. 2. Moreover, since the UAV 1 is used for search, the UAV 1 may be smaller in size than the UAV 50 and may be a compact type.

The drive unit 11 includes a motor, a rotation shaft, and the like. The drive unit 11 rotates a plurality of rotors by, for instance, the motor and the rotation shaft that are driven in accordance with a control signal output from the control unit 16. The positioning unit 12 includes a radio wave receiver, an altitude sensor, and the like. The positioning unit 12 receives, by the radio wave receiver, for example, a radio wave transmitted from a satellite of a GNSS (Global Navigation Satellite System), and detects the current position of the UAV 1 in a horizontal direction on the basis of the radio wave. Here, the current position in the horizontal direction is a two-dimensional position coordinate and may be expressed by latitude and longitude. Incidentally, the current position of the UAV 1 in the horizontal direction may be corrected on the basis of an image captured by a camera of the sensor unit 14. Self-position information indicating the current position detected by the positioning unit 12 is output to the control unit 16. Further, the positioning unit 12 may detect the current position of the UAV 1 in a vertical direction by the altitude sensor such as an atmospheric pressure sensor. Here, the current position in the vertical direction may be expressed by altitude. In this case, the self-position information includes altitude information indicating the altitude of the UAV 1. The communication unit 13 has a wireless communication function and is responsible for controlling communication via the communication network NW.

The sensor unit 14 includes various sensors used for flight control of the UAV 1. Examples of the various sensors include an optical sensor, a distance sensor, a triaxial angular velocity sensor, a triaxial acceleration sensor, a geomagnetic sensor, and the like. Sensing data obtained by sensing of the sensor unit 14 is output to the control unit 16. Here, the "sensing" means, for example, measuring, imaging, or sensing some amount (e.g., a physical quantity). The optical sensor includes, for example, a camera. For example, a real space in a range falling within the angle of view of the camera is continuously captured. The sensing data obtained by the sensing of the camera includes an RGB image of the sensed area. Further, the sensor unit 14 may include a thermosensor that contactlessly senses the temperature radiated by a search target (e.g., the UAV 50). Examples of the thermosensor include infrared thermography that senses infrared rays emitted from a search target and measures the temperature from the amount of radiation. In this case, the sensing data obtained by the sensing of the thermosensor includes a temperature distribution image of the sensed area. The distance sensor measures a distance to a search target by a laser beam or an ultrasonic wave.

Figure 3:
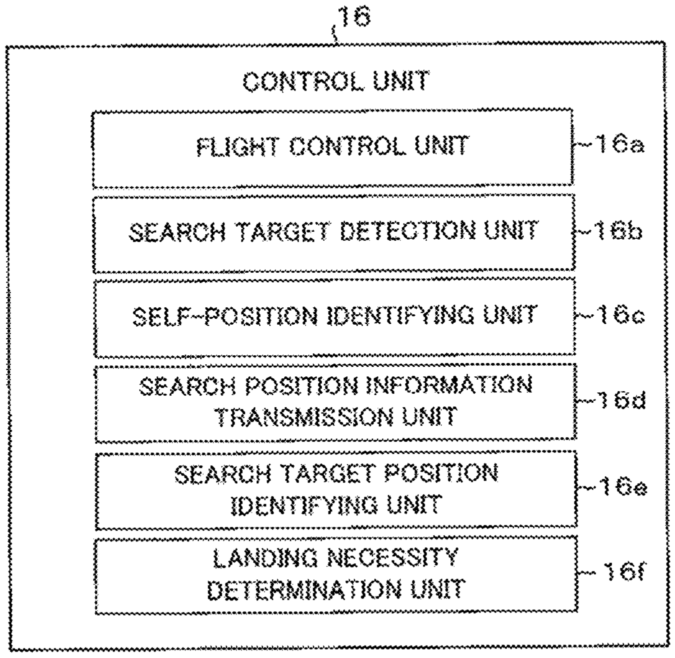
FIG. 3 is a diagram illustrating an example of functional blocks in a control unit 16.

The storage unit 15 includes, for instance, a nonvolatile memory, and stores various programs and data. Moreover, the vehicle ID of the UAV 1 is stored in the storage unit 15. The control unit 16 includes a CPU (Central Processing Unit, a ROM (Read Only Memory), a RAM (Random Access Memory), and the like. FIG. 3 is a diagram illustrating an example of functional blocks in the control unit 16. As illustrated in FIG. 3, the control unit 16 functions as a flight control unit 16*a* (an example of flight control means), a search target detection unit 16*b* (an example of detection means), a self-position identifying unit 16*c* (an example of first identifying means), a search position information transmission unit 16*d* (an example of transmission means), a search target position identifying unit 16*e* (an example of second identifying means), and a landing necessity determination unit 16*f* (an example of determination means) in accordance with a program (program code group) stored in the ROM (or the storage unit 15).

Figure 4:
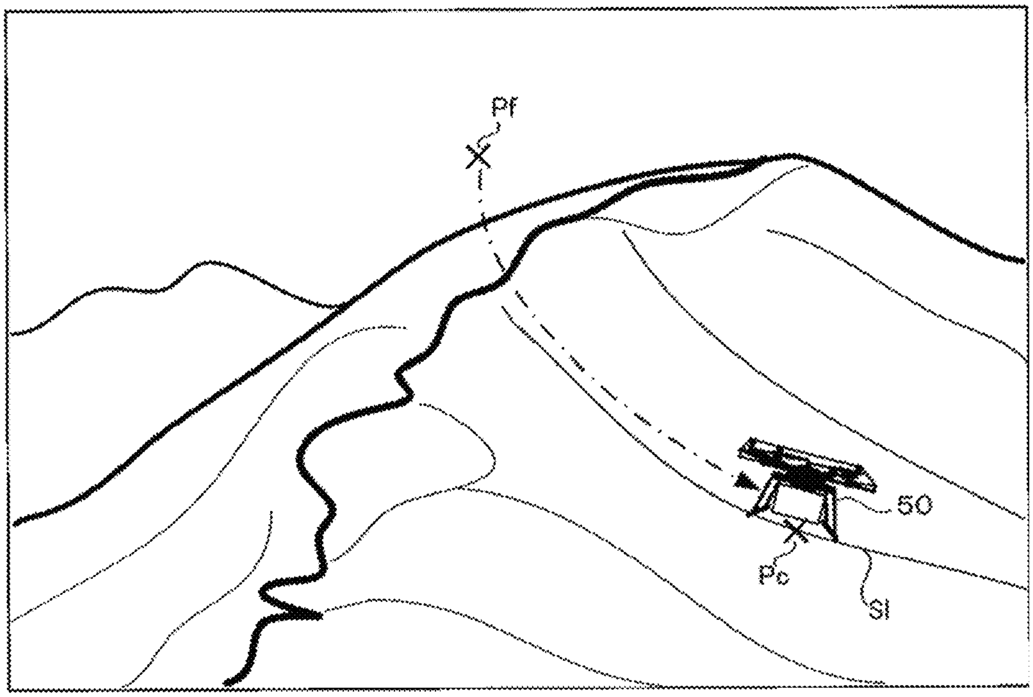
FIG. 4 is a conceptual diagram illustrating a positional relationship between a final acquisition position Pf of an UAV 50 and a current position Pc of the UAV 50.

The flight control unit 16*a* implements flight control to cause the UAV 1 to fly toward a destination. In this flight control, the number of rotations of the rotor and the current position, the attitude, and the traveling direction of the UAV 1 are controlled using self-position information indicating the current position detected by the positioning unit 12, sensing data obtained by sensing of the sensor unit 14 and the like. As a result, the UAV 1 can autonomously move (travel) to the destination. Here, the destination is, for example, the position immediately before the UAV 50 disappears and is the position of the UAV 50 in the horizontal direction (an example of the second position). Such a position (hereinafter, referred to as a "final acquisition position") is, for example, a position indicated in the self-position information most recently received (acquired) from the UAV 50 by the UTMS 2. FIG. 4 is a conceptual diagram illustrating a positional relationship between the final acquisition position Pf of the UAV 50 and the current position Pc of the UAV 50. In the example of FIG. 4, in the mountain area, the UAV 50 has flown at the final acquisition position Pf, but thereafter, the UAV 50 contacts the slope S1 of the mountain and stops at the current position Pc. Incidentally, the flight control unit 16*a* may acquire final position information (second position information) indicating the final acquisition position of the UAV 50 from the management server MS.

For example, in the case within a range (hereinafter, referred to as a "search range") having a predetermined distance (e.g., several meters to several hundred meters) from the final acquisition position of the UAV 50, the search target detection unit 16*b* starts detection of the UAV 50 that is the search target, on the basis of sensing data obtained by sensing of the sensor unit 14. For example, the UAV 50 is detected by image recognition from at least one of an RGB image or a temperature distribution image included in the sensing data. In such image recognition, (preset) feature information about the appearance of the UAV 50 may be used. If a long time has not elapsed since the UAV 50 has disappeared, it is considered that the temperature of the battery is high. Thus, it is possible to increase the UAV 50 detection accuracy by using the temperature distribution image. Here, the flight control unit 16*a* may fly the UAV 1 from the departure place of the UAV 1 toward the final acquisition position of the UAV 50 in a normal flight mode, and may fly the UAV 1 by switching from the normal flight mode to a search flight mode when the UAV 1 enters the search range from the final acquisition position. As a result, the flight is prioritized until the UAV 1 reaches the search range, and the search is prioritized after the UAV 1 reaches the search range. In this way, the power consumption of the UAV 1 can be reduced while the search efficiency can be improved.

For example, the flight control unit 16*a* may decrease the flight speed of the UAV 1 in response to switching from the normal flight mode to the search flight mode. This allows for detection, with enough time, of the UAV 50, so that the UAV 50 detection accuracy can be increased. Moreover, in a case where the UAV 1 includes a thermosensor, the search target detection unit 16*b* may detect the UAV 50 on the basis of sensing data obtained by sensing of the thermosensor instead of the camera (or together with the camera) in response to switching from the normal flight mode to the search flight mode. That is, in order to detect the UAV 50, the camera is switched to the thermosensor, or the thermosensor is activated in addition to the camera. This makes it possible to detect the temperature of battery in the UAV 50, so that the UAV 50 detection accuracy can be increased.

Figure 5:
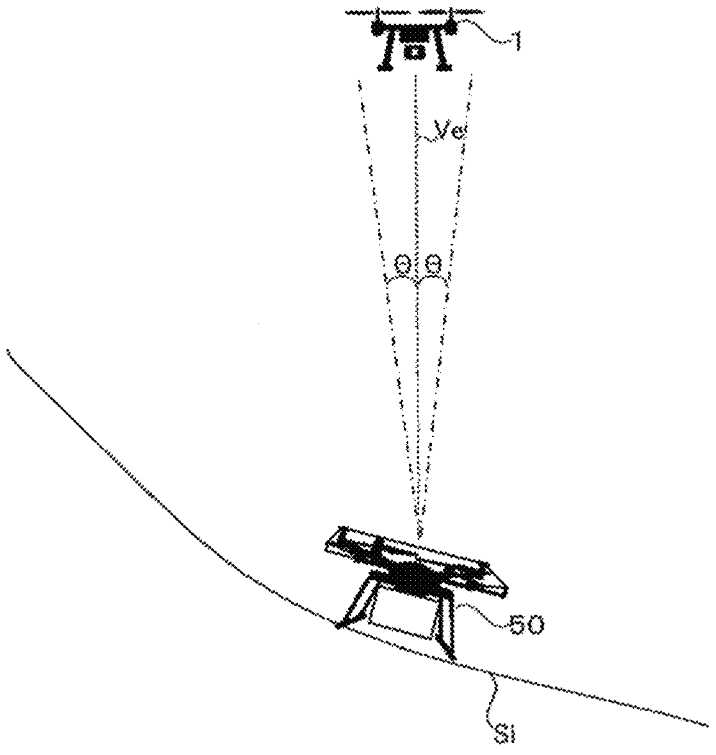
FIG. 5 is a conceptual diagram illustrating a state when the UAV 1 is positioned above the UAV 50.

Then, when the UAV 50 is detected by the search target detection unit 16*b*, the flight control unit 16*a* moves the UAV 1 to a position above (in the sky) the detected UAV 50. FIG. 5 is a conceptual diagram illustrating a state when the UAV 1 is positioned above the UAV 50. As illustrated in FIG. 5, the position above the UAV 50, which is grounded on the mountain slope S1, is desirably a position that is in the vertical direction of the UAV 50 and is higher than the altitude of the UAV 50. That is, the UAV 1 is preferably moved directly above the UAV 50. However, as illustrated in FIG. 5, the position above the UAV 50 may be a position shifted by several degrees @ from the vertical axis Ve of the UAV 50 in consideration of an error. Moreover, the distance between the UAV 50 and the UAV 1 when the UAV 1 has moved to a position above the UAV 50 is not particularly limited, but may be, for example, several meters. Moreover, the flight control unit 16*a* preferably makes the UAV 1 hover at a position above the UAV 50. As a result, the UAV 1 serves as a mark of the position of the UAV 50, and a collector (searcher) can easily grasp the position of the missing UAV 50. However, the state where the UAV 1 is hovering is not limited to the state where the UAV 1 completely stands still in the air, and some UAV 1 position fluctuation may occur.

The self-position identifying unit 16*c* identifies the current position (self-position) of the UAV 1 in the horizontal direction when the UAV 1 has moved to the position above the UAV 50. For example, the self-position identifying unit 16*c* identifies the current position of the UAV 1 in the horizontal direction by acquiring self-position information indicating the current position detected by the positioning unit 12 when the UAV 1 has moved to the position above the UAV 50. The search position information transmission unit 16*d* transmits, together with the vehicle ID of the UAV 1, search position information (first position information) indicating the current position identified by the self-position identifying unit 16*c* as the current position (an example of the first position) of the UAV 50 in the horizontal direction to the management server MS via the communication unit 13. That is, the current position of the UAV 1 is regarded as the current position of the missing UAV 50. Incidentally, the search position information includes a search result flag indicating that the search position information is a search result. The search position information as so transmitted to the management server MS is transmitted to a mobile terminal device of the collector. Alternatively, the search position information may be directly transmitted to a mobile terminal device (an example of the given device) of the collector via the communication unit 13.

Figure 6:
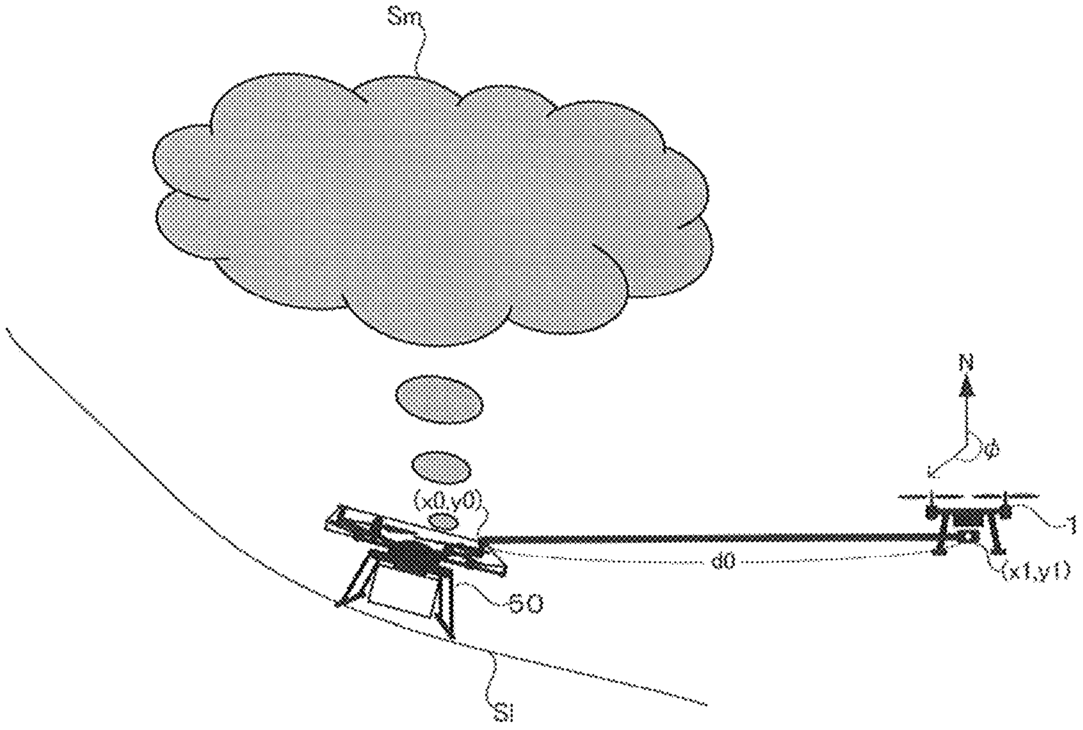
FIG. 6 is a conceptual diagram illustrating a state where the UAV 1 is positioned away from the position above the UAV 50 (Example 1).
Figure 7:
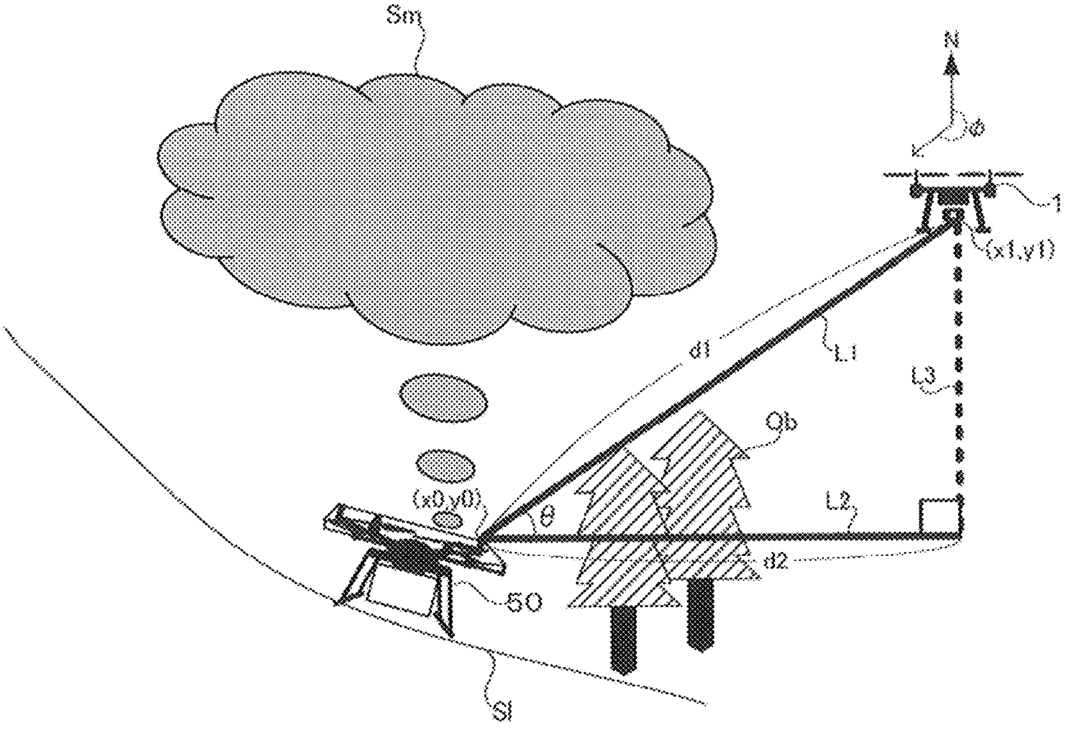
FIG. 7 is a conceptual diagram illustrating a state where the UAV 1 is positioned away from the position above the UAV 50 (Example 2).

Meanwhile, in a case where it is difficult to move the UAV 1 to a position above the UAV 50, the flight control unit 16*a* moves the UAV 1 to a position away from the position above the UAV 50. This makes it possible to improve the safety of the UAV 1. Examples of a case where it is difficult to move the UAV 1 to the position above the UAV 50 include a case where smoke is generated due to a landing impact and the sky above the UAV 50 is covered with the smoke. The distance between the position above the UAV 50 and the position away from the position above the UAV 50 may be determined in advance, or may be set in accordance with the situation above the UAV 50 (e.g., spread of smoke). FIGS. 6 and 7 are conceptual diagrams each illustrating a state where the UAV 1 is positioned away from the position above the UAV 50. In the example of FIG. 6, the UAV 1 is located at a position (an error is taken into account) that is not in the vertical direction of the UAV 50 grounded on the mountain slope S1 and is at the same height as the altitude of the UAV 50 (i.e., a position horizontally located relative to the position of the UAV 50). On the other hand, in the example of FIG. 7, since an obstacle Ob such as trees is at a position horizontally located from the position of the UAV 50 grounded on the mountain slope S1, the UAV 1 is at a position (an error is taken into account) that is not in the vertical direction of the UAV 50 and is higher than the altitude of the UAV 50.

The search target position identifying unit 16*e* identifies the current position of the UAV 1 in the horizontal direction, the azimuth angle of the UAV 1, and the distance from the UAV 1 to the UAV 50 when the UAV 1 has moved to a position away from the position above the UAV 50, and identifies the current position of the UAV 50 on the basis of the identified current position, the identified azimuth angle, and the identified distance. Here, the azimuth angle of the UAV 1 is obtained from the geomagnetic sensor included in the sensor unit 14. Moreover, the distance from the UAV 1 to the UAV 50 is obtained from the distance sensor included in the sensor unit 14. In the example of FIG. 6, the current position (x1, y1) of the UAV 1 in the horizontal direction, the azimuth angle φ of the UAV 1, and the distance do from the UAV 1 to the UAV 50 are identified, and the current position (x1, y1), the azimuth angle φ, and the distance do are assigned to a given calculation formula, so that the current position (x0, y0) of the UAV 50 is easily calculated.

On the other hand, in the example of FIG. 7, the current position (x1, y1) of the UAV 1 in the horizontal direction, the azimuth angle φ of the UAV 1, and the distance d1 from the UAV 1 to the UAV 50 are identified. Further, a right triangle including a hypotenuse L1 connecting the UAV 1 and the UAV 50, a base L2 extending in the horizontal direction relative to the UAV 50, and a height L3 extending in the vertical direction relative to the UAV 1 is defined to calculate a length (distance) d2 (=d1 cos θ) of the base L2. Then, the current position (x1, y1), the azimuth angle q, and the distance d2 are assigned to a given calculation formula to calculate the current position (x0, y0) of the UAV 50. Incidentally, the current position (x0, y0) of the UAV 50 may be calculated, without defining the right triangle, from the current position (x1, y1) of the UAV 1 in the horizontal direction, the azimuth angle φ of the UAV 1, and the distance d1 from the UAV 1 to the UAV 50 by using the forward solution of known Vincenty method.

As described above, it may be difficult to move the UAV 1 to the position above the UAV 50. In this case, the search position information transmission unit 16*d* transmits, together with the vehicle ID of the UAV 1, to the management server MS via the communication unit 13, the "search position information (first position information) indicating the current position (an example of the first position) of the UAV 50" identified by the search target position identifying unit 16*e*. That is, in this case, the search position information indicating not the "current position of the UAV 1" identified by the self-position identifying unit 16*c* but the "current position of the UAV 50" identified by the search target position identifying unit 16*e* is transmitted to the management server MS. Incidentally, the search position information includes a search result flag indicating that the search position information is a search result. The search position information as so transmitted to the management server MS is transmitted to a mobile terminal device of the collector. Alternatively, the search position information may be directly transmitted to a mobile terminal device of the collector via the communication unit 13.

After the UAV 50 is detected, the landing necessity determination unit 16*f* identifies an estimated time (estimated arrival time) when the collector arrives at the current position indicated in the search position information to collect the UAV 50 and the remaining capacity of the battery of the UAV 1. Then, the landing necessity determination unit 16*f* determines whether or not to temporarily land the UAV 1 (i.e., the vehicle is landed and stands by) at a place where the UAV 1 can land around the current position on the basis of the identified estimated time and the remaining capacity of the battery (i.e., determines whether or not the landing is necessary). For example, in a case where the continuous flight possible time according to the remaining capacity of the battery is shorter than the time from the current time to the estimated time, the landing necessity determination unit 16*f* determines that the UAV 1 should be landed temporarily at a place where the UAV 1 can land. Here, the higher the remaining capacity of the battery, the longer the continuous flight possible time. The estimated time may be acquired from the management server MS.

Moreover, the place where landing is possible may be identified on the basis of the sensing data obtained by the sensing of the sensor unit 14. For example, a ground having an area equal to or larger than a threshold (e.g., several tens of $m^2$) is identified as a place where landing is possible. The threshold of the area may be set on the basis of, for example, the horizontal size of the UAV 1. Alternatively, a ground having an area equal to or larger than a threshold and having a slope angle less than a threshold (e.g., several %) may be identified as a place where landing is possible. The slope angle is, for example, a value obtained by dividing a vertical distance by a horizontal distance (unit distance) and expressed in percentage. The threshold of the slope angle may be set from the viewpoint that the UAV 1 can land easily and the collector can easily collect the UAV 1. Then, in a case where it is determined by the landing necessity determination unit 16*f* that the UAV 1 should be temporarily landed at a place where the UAV 1 can land, the flight control unit 16*a* temporarily lands the UAV 1 at the place where the UAV 1 can land, and then (e.g., at a predetermined time before the estimated time) takes off the UAV 1 to move the UAV 1 to, for example, the position above the UAV 50. This makes it possible to reduce the power consumption of the UAV 1.

[1-2. Configuration and Function of Management Server MS]

Figure 8:
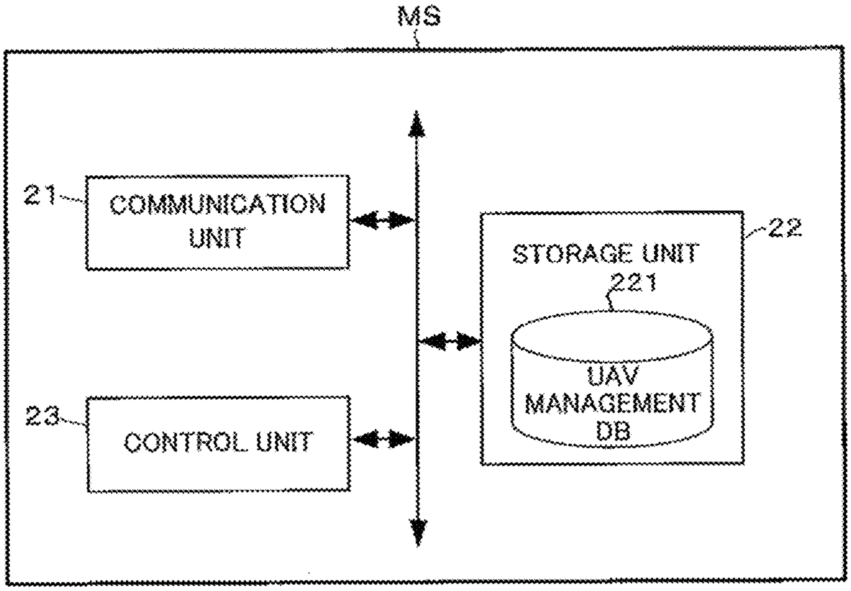
FIG. 8 is a diagram illustrating a schematic configuration example of a management server MS.

Next, the configuration and function of the management server MS will be described with reference to FIG. 8. FIG. 8 is a diagram illustrating a schematic configuration example of the management server MS. As illustrated in FIG. 8, the management server MS includes a communication unit 21, a storage unit 22, a control unit 23, and the like. The communication unit 21 is responsible for controlling communication via the communication network NW. The self-position information and the vehicle ID transmitted from the UAV 50 before the disappearance, the self-position information and the vehicle ID transmitted from the UAV 1, and the search position information and the vehicle ID transmitted from the UAV 1 are each received by the communication unit 21. The storage unit 22 includes, for instance, a hard disk drive and stores various programs and data. Moreover, in the storage unit 22, a UAV management database 221, for instance, is constructed.

The UAV management database 221 stores, for example, the vehicle IDs of UAVs (including the UAV 1 and the UAV 50), the self-position information, and the reception time in association with each vehicle ID. Here, among the self-position information of the UAV 50, the self-position information associated with the latest reception time is the final position information. Moreover, the UAV management database 221 stores the vehicle ID of the UAV 50 in association with the vehicle ID of the UAV 1 for searching for the UAV 50, the search position information transmitted from the UAV 1, collector information (e.g., an email address of the collector) about the UAV 50 collector. The collector information may be transmitted via the communication unit 21 to the UAV 1 to search for the UAV 50.

The control unit 23 includes a CPU, a ROM, a RAM, and the like. In a case where the self-position information and the vehicle ID cannot be received from the UAV 50 for a predetermined time or longer from the previous reception, the control unit 23 detects missing of the UAV 50 and identifies the final acquisition position of the UAV 50. At this time, the control unit 23 may select the UAV 1 for searching for the UAV 50 detected as missing and the collector of the UAV 50. Then, the control unit 23 uses the communication unit 21 to transmit, to the UAV 1, a search request (investigation request) regarding the UAV 50 detected as missing. This search request may include final position information indicating the identified final acquisition position. Moreover, the control unit 23 calculates an estimated time when the UAV 50 collector arrives at the current position indicated by the search position information, and transmits the estimated time to the UAV 1 through the communication unit 21.

[2. Operation of Unmanned Aerial Vehicle Search System S]

Figure 9:
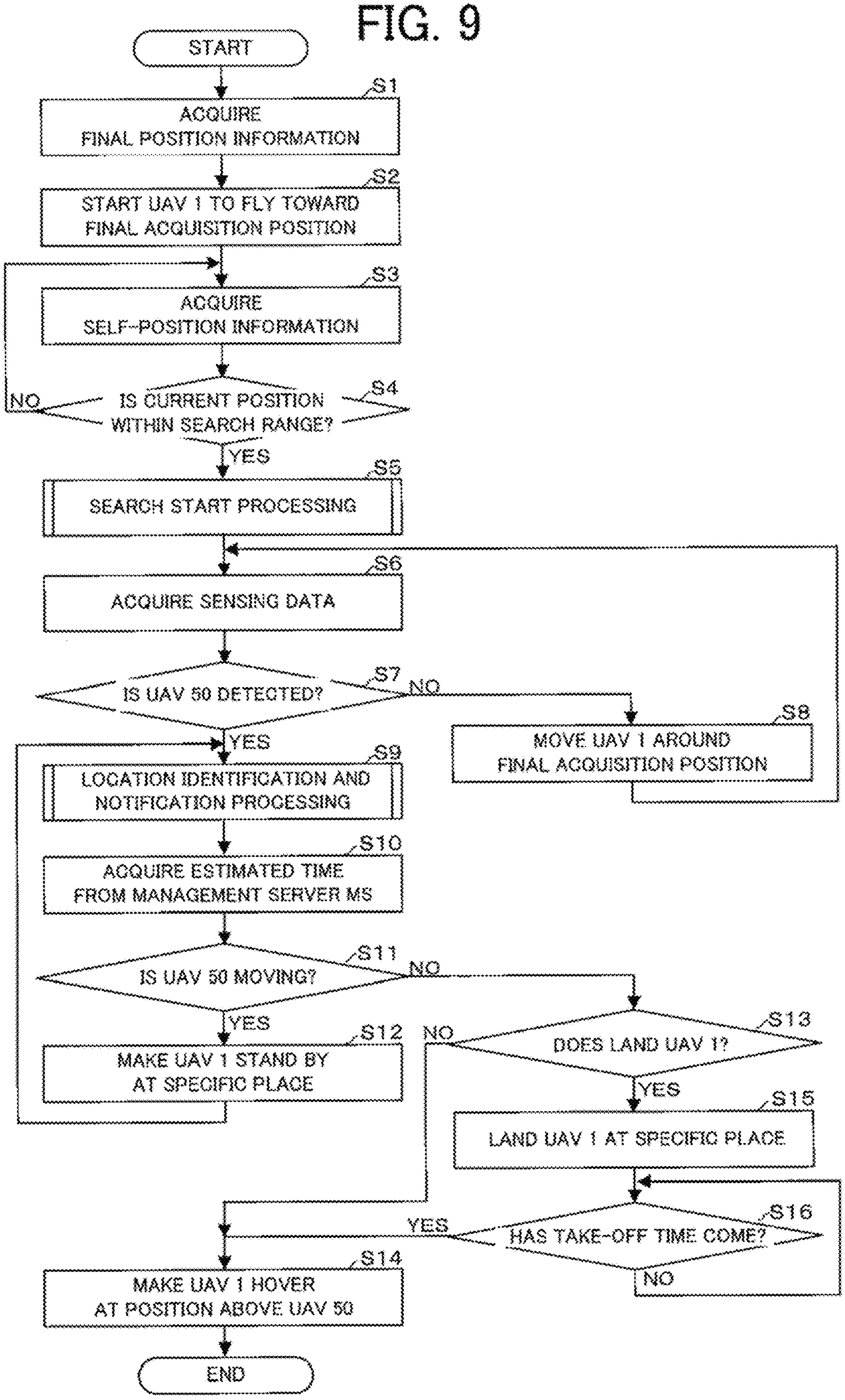
FIG. 9 is a flowchart illustrating an example of processing executed by the control unit 16 of the UAV 1.

Next, FIG. 9 and other figures are used as a reference to describe the operation of the unmanned aerial vehicle search system S according to this embodiment. FIG. 9 is a flowchart illustrating an example of processing executed by the control unit 16 of the UAV 1. Incidentally, in the following operation example, it is assumed that the disappearance of the UAV 50 is detected by the management server MS, and the UAV 1 for searching for the UAV 50 and the collector of the UAV 50 are selected. The process illustrated in FIG. 9 is started when the UAV 1 receives the search request from the management server MS.

When the process illustrated in FIG. 9 is started, the control unit 16 of the UAV 1 acquires final position information indicating the final acquisition position of the UAV 50 (step S1). Such final position information is obtained from the received search request. Incidentally, when the search request is received, the control unit 16 of the UAV 1 may request final position information from the management server MS to acquire the final position information from the management server MS. Next, the control unit 16 of the UAV 1 starts the flight of the UAV 1 in the normal flight mode toward the final acquisition position indicated by the final position information acquired in step S1 (step S2).

Next, the control unit 16 of the UAV 1 acquires self-position information indicating the current position detected by the positioning unit 12 (step S3). Incidentally, the control unit 16 of the UAV 1 may transmit the self-position information acquired in step S3 to the management server MS. Next, the control unit 16 of the UAV 1 determines whether or not the current position indicated by the self-position information acquired in step S3 is within the above-described search range (i.e., whether the UAV 1 has entered the search range having a predetermined distance from the final acquisition position) (step S4). When it is determined that the current position of the UAV 1 is not within the search range (step S4: NO), the process returns to step S3. On the other hand, when it is determined that the current position of the UAV 1 is within the search range (step S4: YES), the process goes to step S5. In step S5, the control unit 16 of the UAV 1 switches from the normal flight mode to the search flight mode, and executes processing for starting a search for the UAV 50.

Figure 10:
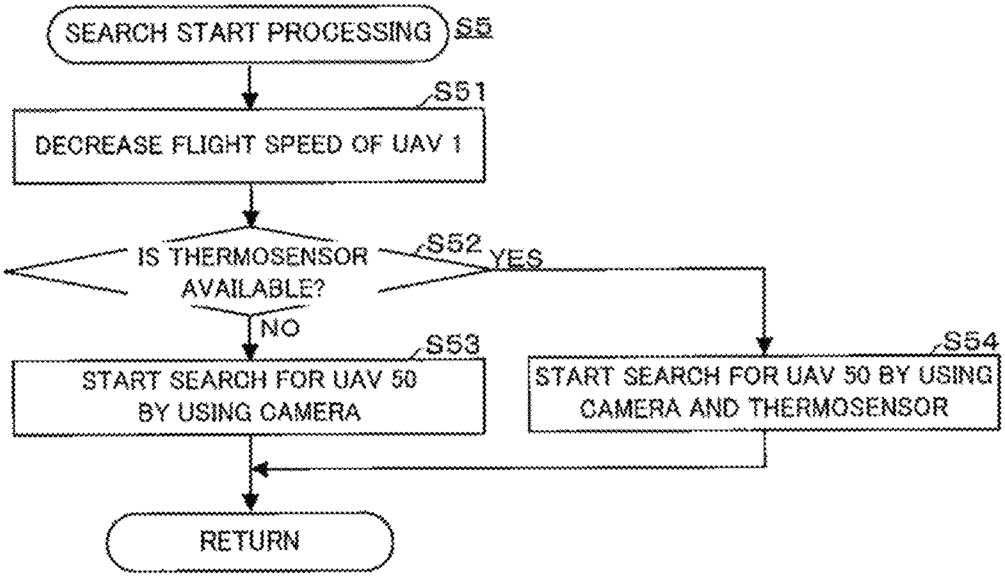
FIG. 10 is a flowchart illustrating an example of search start processing in step S5 of FIG. 9.

FIG. 10 is a flowchart illustrating an example of the search start processing in step S5 of FIG. 9. In step S51 illustrated in FIG. 10, the control unit 16 of the UAV 1 decreases the flight speed of the UAV 1. Next, the control unit 16 of the UAV 1 determines whether or not the thermosensor is available (step S52). When it is determined that the thermosensor is not available (step S52: NO), the process goes to step S53. For example, in a case where the thermosensor is not installed in the UAV 1 or in a case where the thermosensor is installed but there is a problem, it is determined that the thermosensor is not available. In step S53, the control unit 16 of the UAV 1 starts searching for the UAV 50 by using a camera. On the other hand, when it is determined that the thermosensor is available (step S52: YES), the control unit 16 of the DAV 1 activates (i.e., enables) the thermosensor, and starts searching for the UAV 50 by using the camera and the thermosensor (step S54).

Back to FIG. 9, in step S6, the control unit 16 of the UAV 1 acquires sensing data obtained by sensing of the sensor unit 14 (the camera, or the camera and the thermosensor). Next, the control unit 16 of the UAV 1 determines whether or not the UAV 50 has been detected (in other words, found) on the basis of the sensing data acquired in step S6 (step S7). When it is determined that the UAV 50 is not detected (step S7: NO), the control unit 16 of the UAV 1 moves the UAV 1 around the final acquisition position of the UAV 50 within the search range (step S8). Then, the process returns to step S6, and the above processing is repeated. Here, examples of a case of moving around the final acquisition position include a case of flying around the final acquisition position while appropriately changing the altitude of the UAV 1. On the other hand, when the search target detection unit 16*b* determines that the UAV 50 has been detected (step S7: YES), the control unit 16 of the UAV 1 executes location identification and notification processing for identifying and notifying the location (current position) of the UAV 50 (step S9). Incidentally, the detected UAV 50 position is monitored (i.e., continuously captured) by the control unit 16 of the UAV 1.

Figure 11:
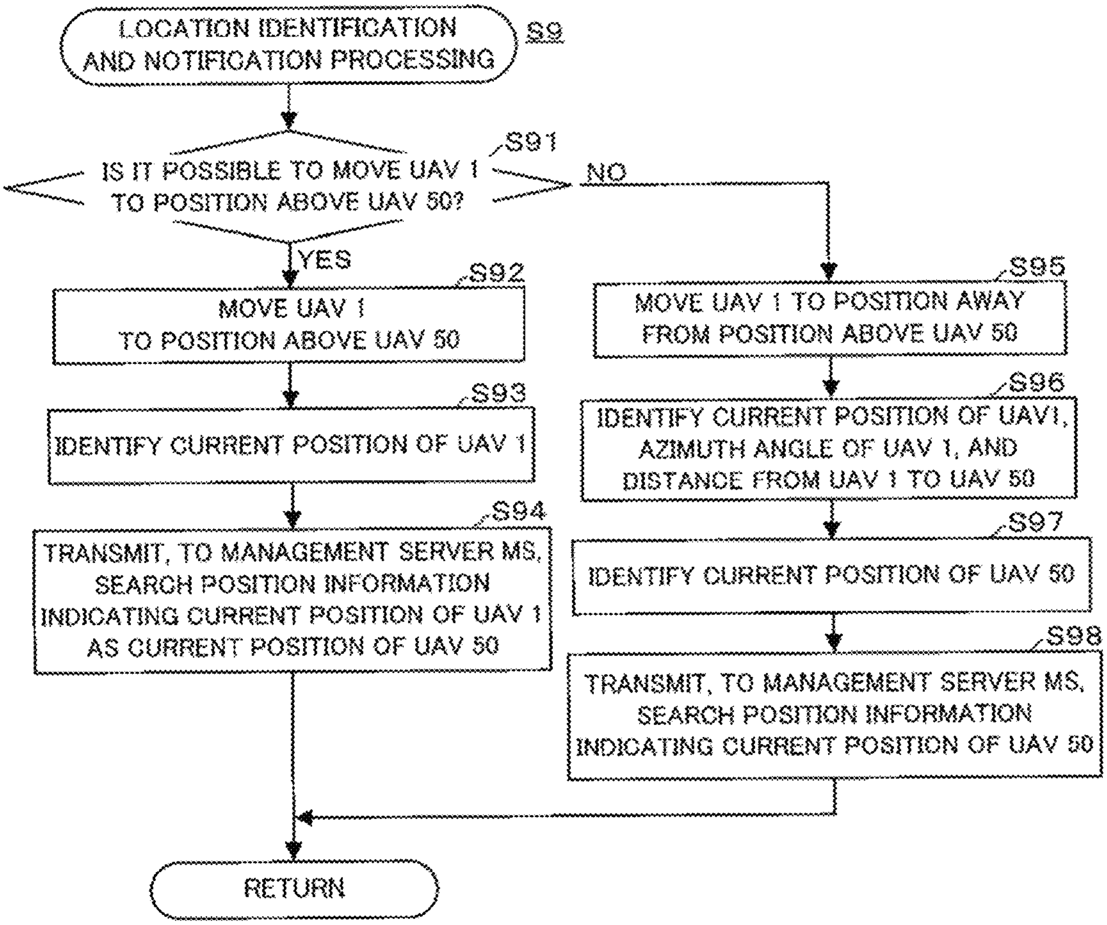
FIG. 11 is a flowchart illustrating an example of location identification and notification processing in step S9 of FIG. 9.

FIG. 11 is a flowchart illustrating an example of the location identification and notification processing in step S9 of FIG. 9. In step S91 illustrated in FIG. 11, the control unit 16 of the UAV 1 determines whether or not it is possible to move the UAV 1 to a position above the UAV 50 found. When it is determined to be possible to move the UAV 1 to the position above the UAV 50 (step S91: YES), the control unit 16 of the UAV 1 moves the UAV 1 to the position above the UAV 50 (step S92). Here, the control unit 16 of the UAV 1 may make the UAV 1 hover at the position above the UAV 50. Next, the control unit 16 of the UAV 1 uses the self-position identifying unit 16*c* to identify the current position (two-dimensional position coordinate) of the UAV 1 when the UAV 1 has moved to the position above the UAV 50 (step S93). Next, the control unit 16 of the UAV 1 uses the search position information transmission unit 16*d* to transmit, to the management server MS, the search position information indicating the current position of the UAV 1 identified in step S93 as the current position of the UAV 50 and the vehicle ID of the UAV 1 (step S94). As a result, the management server MS is notified of the location of the missing UAV 50.

On the other hand, when it is determined to be impossible (in other words, difficult) to move the UAV 1 to the position above the UAV 50 (step S91: NO), the control unit 16 of the UAV 1 moves the UAV 1 to a position away from the position above the UAV 50 found as illustrated in FIG. 6 or 7 (step S95). Here, the control unit 16 of the UAV 1 may make the UAV 1 hover at the position away from the position above the UAV 50. Next, the control unit 16 of the UAV 1 identifies the current position of the UAV 1 in the horizontal direction when the UAV 1 has moved to that position, the azimuth angle of the UAV 1, and the distance from the UAV 1 to the UAV 50 (step S96). Next, the control unit 16 of the UAV 1 calculates and identifies the current position (two-dimensional position coordinate) of the UAV 50 by the search target position identifying unit 16*e* as described above on the basis of the current position, the azimuth angle, and the distance of the UAV 1 identified in step S96 (step S97). Next, the control unit 16 of the UAV 1 uses the search position information transmission unit 16*d* to transmit, to the management server MS, the search position information indicating the current position of the UAV 50 identified in step S97 and the vehicle ID of the UAV 1 (step S98). As a result, the management server MS is notified of the location of the missing UAV 50.

When receiving the search position information and the vehicle ID from the UAV 1, the control unit 23 of the management server MS recognizes that the UAV 50 has been found from a search result flag included in the search position information, and transmits the search position information to a mobile terminal device of the UAV 50 of the collector. Next, the control unit 23 of the management server MS determines (selects) a collection route from the current position of the UAV 50 collector to the current position indicated in the search position information on the basis of map data. Next, the control unit 23 calculates (estimates) a time required for the collector to arrive at the current position indicated by the search position information when the collector travels along the determined collection route. Then, the control unit 23 calculates the estimated time when the UAV 50 collector arrives at the current position on the basis of the calculated required time and the current time. The estimated time calculated in this manner is transmitted from the management server MS to the UAV 1.

Back to FIG. 9, in step S10, the control unit 16 of the UAV 1 acquires, via the communication unit 13, the estimated time transmitted from the management server MS. Next, the control unit 16 of the UAV 1 determines whether or not the UAV 50 under monitoring is moving (step S11). For instance, examples of a case of the moving UAV 50 include a case where the UAV 50 grounded to a slope of mountain is sliding down the slope. When the UAV 50 is determined to be moving (step S11: YES), the control unit 16 of the UAV 1 makes the UAV 1 stand by at a specific (e.g., safe) place (in the air or on the ground) for a predetermined time (e.g., 1 to 3 minutes) (step S12). Here, the wording "makes the UAV 1 stand by" may mean causing the UAV 1 to hover in the air or causing the UAV 1 to land on the ground. Incidentally, after the predetermined time has passed, the process returns to step S9, and the location identification and notification processing, for example, is re-executed. Incidentally, the control unit 16 of the UAV 1 makes the UAV 1 stand by at the specific place for the predetermined time, and then moves the UAV 1 to the position above or away from the UAV 50 in the following processing. This makes it possible to improve the safety of the UAV 1.

On the other hand, when the UAV 50 is not determined to be moving (step S11: NO), the control unit 16 of the UAV 1 identifies the remaining capacity (current remaining capacity) of the battery of the UAV 1. Then, the control unit 16 of the UAV 1 uses the landing necessity determination unit **16*f* to determine whether or not to temporarily land the UAV 1 at a place where the UAV 1 can land around the current position on the basis of the acquired estimated time (the latest estimated time) and the identified remaining capacity of the battery (step S13). When it is determined not to temporarily land the UAV 50 at a place where the UAV can land (step S13: NO), the control unit 16 of the UAV 1 makes the UAV 1 hover at the position above or away from the UAV 50, for example, until the estimated time comes (step S14). Thereafter, the process illustrated in FIG. 9 ends, and the UAV 1** returns.

On the other hand, when it is determined to temporarily land the UAV 50 at the place where the UAV can land (step S13: YES), the control unit 16 of the UAV 1 identifies the place where the UAV can land as described above, and lands the UAV at the identified place (step S15). Next, the control unit 16 of the UAV 1 determines whether or not a take-off time (e.g., 11:20) that is a predetermined time (e.g., several minutes to several tens of minutes) before the acquired estimated time (e.g., 11:30) has come (step S16). When it is determined that the take-off time has not come (step S16: NO), the processing is repeated. On the other hand, when it is determined that the take-off time has come (step S16: YES), the control unit 16 of the UAV 1 takes off the UAV 1 to move the UAV 1 to the position above or away from the UAV 50, and then makes the UAV 1 hover (step S14).

As described above, according to the above embodiment, the UAV 1 detects the UAV 50 that is the search target on the basis of the sensing data obtained by sensing of the sensor unit 14, and moves to the position above the detected UAV 50. And then, the UAV 1 identifies the current position of the UAV 1 when the UAV 1 has moved to the position above the UAV 50, and transmits search position information indicating the identified current position as the current position of the UAV 50. Thus, this enables efficient recovery of the missing UAV 50. In particular, the UAV 1 may be made to hover at the position above the UAV 50. In this configuration, the UAV 1 serves as a mark of the position of the UAV 50, and the collector can easily grasp the position of the missing UAV 50.

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. The above embodiment is configured such that the control unit 16 of the UAV 1 detects the UAV 50 as the search target on the basis of the sensing data obtained by sensing of the sensor unit 14. However, by configuring such that the sensing data is transmitted from the UAV 1 to the management server MS, the UAV 50 may be detected by the control unit 23 of the management server MS. In this case, the control unit 23 of the management server MS transmits, to the UAV 1, a control command for moving the UAV 1 to a position above the detected UAV 50.

Moreover, in the above embodiment, the control unit 16 of the UAV 1 is configured to identify the current position of the UAV 50 on the basis of the current position of the UAV 1, the azimuth angle of the UAV 1, and the distance from the UAV 1 to the UAV 50. However, by configuring such that the current position of the UAV 1, the azimuth angle of the UAV 1, and the distance from the UAV 1 to the UAV 50 are transmitted from the UAV 1 to the management server MS, the current position of the UAV 50 may be identified by the control unit 23 of the management server MS. Moreover, the above embodiment is configured such that the control unit 16 of the UAV 1 identifies the estimated time of arrival of the collector and the remaining capacity of the battery of the UAV 1, and performs the above-described landing necessity determination on the basis of the identified estimated time and remaining capacity of the battery. However, by configuring such that the remaining capacity of the battery of the UAV 1 is transmitted from the UAV 1 to the management server MS, the above-described landing necessity determination may be performed by the control unit 23 of the management server MS. In this case, when the UAV 50 should be temporarily landed in the landing necessity determination, the control unit 23 of the management server MS identifies a place where the UAV 1 can land and then transmits, to the UAV 1, a control command to cause the UAV 1 to land at the identified place.

REFERENCE SIGNS LIST

1 UAV
2 UTMS

11 Drive unit
12 Positioning unit
13 Communication unit
14 Sensor unit
15 Storage unit
16 Control unit
**16*a*** Flight control unit
**16*b*** Search target detection unit
**16*c*** Self-position identifying unit
**16*d*** Search position information transmission unit
**16*e*** Search target position identifying unit
**16*f*** Landing necessity determination unit
21 Communication unit
22 Storage unit
23 Control unit
S Unmanned aerial vehicle search system

The invention claimed is:

1. A control device that controls a second unmanned aerial vehicle for searching for a missing first unmanned aerial vehicle, the control device comprising:

at least one memory configured to store program code; and at least one processor configured to access the program code and operate as instructed by the program code, the program code including:

detection code configured to cause the at least one processor to detect, when the second unmanned aerial vehicle is within a range of several meters to several hundred meters of a final acquisition position of the missing first unmanned aerial vehicle, the missing first unmanned aerial vehicle as a search target on a basis of sensing data obtained by sensing of a sensor included in the second unmanned aerial vehicle, wherein the final acquisition position is a position most recently acquired by a management server from the missing first unmanned aerial vehicle;

flight control code configured to cause the at least one processor to move the second unmanned aerial vehicle to a position above the detected missing first unmanned aerial vehicle, wherein the position is spaced horizontally due to a smoke generation related to a landing impact of the detected missing first unmanned aerial vehicle, and the position is spaced vertically, with respect to an obstacle on the ground, above the detected missing first unmanned aerial vehicle to permit a view of the detected missing first unmanned aerial vehicle;

first identifying code configured to cause the at least one processor to identify a position of the second unmanned aerial vehicle in a horizontal direction when the second unmanned aerial vehicle has moved to the position above the detected missing first unmanned aerial vehicle; and transmission code configured to cause the at least one processor to transmit, to a given device, first position information indicating the identified position as the first position of the detected missing first unmanned aerial vehicle in a horizontal direction.

2. The control device according to claim 1, wherein the flight control code causes the at least one processor to make the second unmanned aerial vehicle hover at the position above the detected missing first unmanned aerial vehicle.

3. The control device according to claim 1, wherein the flight control code causes the at least one processor to acquire second position information indicating a second position that is immediately before the missing first unmanned aerial vehicle disappears and is in the horizontal direction of the missing first unmanned aerial vehicle, fly the second unmanned aerial vehicle from a departure place of the second unmanned aerial vehicle toward the second position in a normal flight mode, and fly the second unmanned aerial vehicle by switching from the normal flight mode to a search flight mode when the second unmanned aerial vehicle enters a range having a predetermined distance from the second position.

4. The control device according to claim 1, wherein the flight control code causes the at least one processor to decrease a flight speed of the second unmanned aerial vehicle in response to switching from the normal flight mode to the search flight mode.

5. The control device according to claim 1, wherein the second unmanned aerial vehicle comprises, as each sensor, an optical sensor used for flight control of the second unmanned aerial vehicle and a thermosensor that contactlessly senses a temperature radiated by the search target, and the detection code causes the at least one processor to detect the missing first unmanned aerial vehicle on a basis of sensing data obtained by sensing of the thermosensor instead of the optical sensor or together with the optical sensor in response to switching from the normal flight mode to the search flight mode.

6. The control device according to claim 1, wherein the flight control code causes the at least one processor to move the second unmanned aerial vehicle to the position away from the position above the detected missing first unmanned aerial vehicle due to the smoke generation and the obstacle, and the program code further includes second identifying code configured to cause the at least one processor to identify a position of the second unmanned aerial vehicle in the horizontal direction, an azimuth angle of the second unmanned aerial vehicle, and a distance from the second unmanned aerial vehicle to the detected missing first unmanned aerial vehicle when the second unmanned aerial vehicle has moved to the position away from the position above the detected missing first unmanned aerial vehicle, and identify the first position of the detected missing first unmanned aerial vehicle in the horizontal direction on a basis of the identified position, the identified azimuth angle, and the identified distance, wherein the transmission code causes the at least one processor to transmit, to the given device, the first position information indicating the identified first position.

7. The control device according to claim 1, the program code further including determination code configured to cause the at least one processor to identify an estimated time when a collector arrives at the first position so as to recover the detected missing first unmanned aerial vehicle after the missing first unmanned aerial vehicle is detected and a remaining capacity of a battery of the second unmanned aerial vehicle, and determine whether or not to temporarily land the second unmanned aerial vehicle at a place where the second unmanned aerial vehicle can land around the first position on a basis of the estimated time and the remaining capacity of the battery, wherein when it is determined to temporarily land the second unmanned aerial vehicle at the place where the second unmanned aerial vehicle can land, the flight control code causes the at least one processor to temporarily land the second unmanned aerial vehicle at the place where the second unmanned aerial vehicle can land, and then take off the second unmanned aerial vehicle to move the second unmanned aerial vehicle to the position above the detected missing first unmanned aerial vehicle.

8. The control device according to claim 1, the program code further including determination code configured to cause the at least one processor to determine whether or not the detected missing first unmanned aerial vehicle is moving after the missing first unmanned aerial vehicle is detected, wherein when it is determined that the detected missing first unmanned aerial vehicle is moving, the flight control code causes the at least one processor to make the second unmanned aerial vehicle stand by at a specific place for a predetermined time, and then move the second unmanned aerial vehicle to the position above the detected missing first unmanned aerial vehicle.

9. A control method executed by one or more computers for controlling a second unmanned aerial vehicle for searching for a missing first unmanned aerial vehicle, the control method comprising:

detecting, when the second unmanned aerial vehicle is within a range of several meters to several hundred meters of a final acquisition position of the missing first unmanned aerial vehicle the missing first unmanned aerial vehicle as a search target on a basis of sensing data obtained by sensing of a sensor included in the second unmanned aerial vehicle, wherein the final acquisition position is a position most recently acquired by a management server from the missing first unmanned aerial vehicle;

controlling the second unmanned aerial vehicle to move to a position above the detected missing first unmanned aerial vehicle, wherein the position is spaced horizontally due to a smoke generation related to a landing impact of the detected missing first unmanned aerial vehicle, and the position is spaced vertically, with respect to an obstacle on the ground, above the detected missing first unmanned aerial vehicle to permit a view of the detected missing first unmanned aerial vehicle;

identifying a position of the second unmanned aerial vehicle in a horizontal direction when the second unmanned aerial vehicle has moved to the position above the detected missing first unmanned aerial vehicle; and transmitting, to a given device, first position information indicating the identified position as a first position of the detected missing first unmanned aerial vehicle in a horizontal direction.

10. An unmanned aerial vehicle search system including a second unmanned aerial vehicle for searching for a missing first unmanned aerial vehicle, the unmanned aerial vehicle search system comprising:

at least one memory configured to store program code; and at least one processor configured to access the program code and operate as instructed by the program code, the program code including:

detection code configured to cause the at least one processor to detect, when the second unmanned aerial vehicle is within a range of several meters to several hundred meters of a final acquisition position of the missing first unmanned aerial vehicle, the missing first unmanned aerial vehicle as a search target on a basis of sensing data obtained by sensing of a sensor included in the second unmanned aerial vehicle, wherein the final acquisition position is a position most recently acquired by a management server from the missing first unmanned aerial vehicle;

flight control code configured to cause the at least one processor to move the second unmanned aerial vehicle to a position above the detected missing first unmanned aerial vehicle, wherein the position is spaced horizontally due to a smoke generation related to a landing impact of the detected missing first unmanned aerial vehicle, and the position is spaced vertically, with respect to an obstacle on the ground, above the detected missing first unmanned aerial vehicle to permit a view of the detected missing first unmanned aerial vehicle;

first identifying code configured to cause the at least one processor to identify a position of the second unmanned aerial vehicle in a horizontal direction when the second unmanned aerial vehicle has moved to the position above the detected missing first unmanned aerial vehicle; and transmission code configured to cause the at least one processor to transmit, to a given device, first position information indicating the identified position as a first position of the detected missing first unmanned aerial vehicle in a horizontal direction.

11. The control device according to claim 1, wherein the sensing data is configured to include a temperature distribution image indicating at least a temperature of a battery of the missing first unmanned aerial vehicle.

* * * * *